US010947486B1

(12) United States Patent
Crawford et al.

(10) Patent No.: US 10,947,486 B1
(45) Date of Patent: Mar. 16, 2021

(54) SYSTEMS AND METHODS FOR INTEGRATED $CO_2$ REUSE USING VAPOR COMPRESSION

(71) Applicant: Energy Integration, Inc., Boulder, CO (US)

(72) Inventors: Lynn Allen Crawford, Aurora, CO (US); William Bryan Schafer, III, Boulder, CO (US)

(73) Assignee: Energy Integration, Inc., Boulder, CO (US)

( * ) Notice: Subject to any disclaimer, the term of this patent is extended or adjusted under 35 U.S.C. 154(b) by 0 days.

(21) Appl. No.: 16/953,282

(22) Filed: Nov. 19, 2020

Related U.S. Application Data

(60) Provisional application No. 62/939,101, filed on Nov. 22, 2019.

(51) Int. Cl.
*C12F 3/02* (2006.01)
*B01D 1/28* (2006.01)
*B01D 3/00* (2006.01)
*B01D 5/00* (2006.01)
(Continued)

(52) U.S. Cl.
CPC .............. *C12F 3/02* (2013.01); *B01D 1/0058* (2013.01); *B01D 1/2887* (2013.01); *B01D 1/2893* (2013.01); *B01D 3/001* (2013.01); *B01D 3/007* (2013.01); *B01D 3/148* (2013.01); *B01D 5/006* (2013.01)

(58) Field of Classification Search
CPC ....... C12F 3/02; B01D 1/0058; B01D 1/2887; B01D 1/2893; B01D 5/006
See application file for complete search history.

(56) References Cited

U.S. PATENT DOCUMENTS

| 4,340,446 A | 7/1982 | Crawford |
| 4,422,903 A | 12/1983 | Messick et al. |
| 4,536,258 A | 8/1985 | Huhta-Koivisto |

(Continued)

FOREIGN PATENT DOCUMENTS

WO 2017192515 A1 11/2017

*Primary Examiner* — Brian A McCaig
(74) *Attorney, Agent, or Firm* — O'Connor & Company; Ryan P. O'Connor

(57) ABSTRACT

Systems and methods are disclosed for optimizing the process energy required for the conversion of carbon dioxide ($CO_2$) to biochemicals through vapor compression. Mechanical or thermal vapor compression are used to minimize both the process energy and the cooling in condensers, integrating the heat required by those processes and reusing heat that is typically lost. Some variations provide a process for producing biochemicals from biomass, comprising: cooking biomass to release saccharides; fermenting the saccharides to generate a biochemical in aqueous solution, and carbon dioxide; hydrogenating the carbon dioxide with a hydrogen source to generate an additional quantity of biochemical; feeding the fermentation-derived biochemical, as well as the $CO_2$-derived biochemical, to a distillation column for purification; and compressing vapors from the distillation column, using mechanical vapor recompression and/or thermal vapor recompression, to recover heat of distillation that is utilized elsewhere in the biorefinery to reduce overall process energy usage.

28 Claims, 2 Drawing Sheets

(51) Int. Cl.
    *B01D 1/00*     (2006.01)
    *B01D 3/14*     (2006.01)

(56) References Cited

U.S. PATENT DOCUMENTS

| | | |
|---|---|---|
| 4,539,076 A | 9/1985 | Swain |
| 4,585,523 A | 4/1986 | Giddings |
| 4,617,270 A | 10/1986 | Anderson et al. |
| 4,645,569 A | 2/1987 | Akabane et al. |
| 4,692,218 A | 9/1987 | Houben et al. |
| 4,746,610 A | 5/1988 | Smith |
| 5,294,304 A | 3/1994 | Kano et al. |
| 5,772,850 A | 6/1998 | Morris |
| 7,257,945 B2 | 8/2007 | Kass et al. |
| 8,101,217 B2 | 1/2012 | Sovereign et al. |
| 8,101,808 B2 | 1/2012 | Evanko et al. |
| 8,114,255 B2 | 2/2012 | Vane et al. |
| 8,128,787 B2 | 3/2012 | Wynn et al. |
| 8,283,505 B2 | 10/2012 | Evanko et al. |
| 8,304,588 B2 | 11/2012 | Evanko et al. |
| 8,614,077 B2 | 2/2013 | Evanko et al. |
| 8,435,331 B2 | 5/2013 | Littleford |
| 8,535,413 B2 | 11/2013 | Bryan et al. |
| 9,034,629 B2 | 5/2015 | Skraly et al. |
| 9,138,678 B2 | 9/2015 | Huang et al. |
| 9,925,476 B2 | 3/2018 | Crawford et al. |
| 9,925,477 B2 | 3/2018 | Crawford et al. |
| 2014/0243435 A1 | 8/2014 | Blank et al. |
| 2017/0342444 A1* | 11/2017 | Survase .................. C12P 7/28 |
| 2018/0028934 A1 | 2/2018 | Crawford et al. |
| 2018/0237550 A1 | 8/2018 | Miyake et al. |

\* cited by examiner

US 10,947,486 B1

SYSTEMS AND METHODS FOR INTEGRATED $CO_2$ REUSE USING VAPOR COMPRESSION

PRIORITY DATA

This patent application is a non-provisional application claiming priority to U.S. Provisional Patent App. No. 62/939,101, filed on Nov. 22, 2019, which is hereby incorporated by reference herein.

FIELD OF THE INVENTION

The present invention generally relates to the conversion of carbon dioxide into chemical products and integration of vapor compression into the conversion process.

BACKGROUND OF THE INVENTION

Bio-fermentation plants typically generate carbon dioxide ($CO_2$) as a metabolic by-product of fermentation, in addition to the primary bioproduct. In some cases, this $CO_2$ is captured and used, but as often it is vented to the atmosphere as a waste product. Processes are being developed to convert this carbon dioxide to a variety of chemical products, many of which require recovery and refinement of the final products through distillation. The process energy consumed in the distillation of bioproducts often constitutes the largest process energy demand as well as the largest source of carbon dioxide emissions resulting from combustion-supplied heat.

Historically, many processes generating carbon dioxide have emitted the $CO_2$ gas without further processing for conversion, reuse, or sequestration. Concerns regarding the impact of $CO_2$ emissions accelerating anthropogenic climate change have spurred efforts to capture and use or sequester those emissions. Currently, $CO_2$ is used in enhanced oil recovery, dry ice manufacturing, firefighting, manufacturing, refrigeration, food processing, and many other applications.

It is technically known that $CO_2$ may function as a chemical precursor, for its carbon and/or its oxygen content. Natural photosynthesis converts $CO_2$ into sugars in plant matter. Commercial synthesis of chemical products from $CO_2$ is an active area of research, typically utilizing catalytic reactions at high temperatures to produce valuable products. Often, significant energy is required to meet the required conditions for processing $CO_2$ to chemicals. The high energy barrier reduces the commercial feasibility of these options, despite the advantages of a readily available, high-quality source of $CO_2$ from bio-fermentation plants.

There is prior art for catalytic biochemical processing of carbon dioxide and for photochemically generating aliphatic, aromatic, or heterocyclic compounds. See, for example, U.S. Pat. No. 8,435,331, issued on May 7, 2013; U.S. Pat. No. 9,034,629, issued on May 19, 2015; U.S. Patent App. Pub. No. 2014/0243435 A1, published on Aug. 28, 2014; U.S. Patent App. Pub. No. 2018/0237550 A1, published on Aug. 23, 2018; and WO 2017/192515 A1, published on Nov. 9, 2017, each of which is hereby incorporated by reference.

Improved processes and systems are desired commercially for converting carbon dioxide into useful chemicals and materials. Such processes and systems may be implemented within biorefineries designed for conversion of biomass into high-value biofuels and biochemicals.

SUMMARY OF THE INVENTION

Some variations of the invention provide a process for producing biochemicals from a biomass feedstock, the process comprising:

(a) cooking a biomass feedstock in a heated cooking solution, to release saccharides from the biomass feedstock;

(b) fermenting the saccharides to generate a first biochemical in aqueous solution, and carbon dioxide;

(c) hydrogenating the carbon dioxide with a hydrogen source to generate a second biochemical;

(d) feeding the first biochemical in the aqueous solution to a first distillation column, to generate a purified first biochemical;

(e) feeding the second biochemical to the first distillation column, or to a second distillation column, to generate a purified second biochemical; and (f) compressing vapors from the first distillation column, using mechanical vapor recompression and/or thermal vapor recompression, to recover heat of distillation of the first biochemical.

In some embodiments, the process further comprises mechanically treating the biomass feedstock prior to step (b).

In some embodiments, the first biochemical in aqueous solution is preheated via heat exchange with the heated cooking solution, prior to feeding the first biochemical in the aqueous solution to the first distillation column.

In some embodiments, the heat of distillation from step (f) is utilized, at least in part, for the heating the heated cooking solution in step (a).

In these or other embodiments, the process further comprises dehydration of the purified first biochemical, to generate a highly purified first biochemical. The heat of distillation from step (f) may be utilized, at least in part, for the dehydration of the purified first biochemical.

In these or other embodiments, the process further comprises evaporation and/or drying of a bottoms stream from the first distillation column, to generate a stillage product. The heat of distillation from step (f) may be utilized, at least in part, for the evaporation and/or drying of the bottoms stream from the first distillation column.

In certain embodiments, the heat of distillation from step (f) may be utilized, at least in part, for directly or indirectly providing heat in step (c), for the hydrogenation reaction.

In some embodiments, in step (f), the vapors are compressed using mechanical vapor recompression. Optionally, the mechanical vapor recompression may be driven by a combined heat and power system.

In some processes, in step (c), the hydrogen source is water. The water may be derived from the aqueous solution. In certain embodiments, the water is, or includes, recycled steam condensate.

In some processes, the carbon dioxide from fermentation passes directly to step (c). In some embodiments, all $CO_2$ hydrogenated in step (c) is from the carbon dioxide generated in step (b).

The first biochemical may be the same as the second biochemical, or different than the second biochemical. In either embodiment, and preferably when the first biochemical is the same as the second biochemical, the second biochemical is fed to the first distillation column.

When the first biochemical is different than the second biochemical, the second biochemical may be fed to the second distillation column, wherein vapors from the second column are compressed, using mechanical vapor recompression and/or thermal vapor recompression, to recover heat of distillation of the second biochemical.

The first biochemical and the second biochemical may be independently selected from the group consisting of methanol, ethanol, 1-propanol, 2-propanol, n-butanol, isobutanol, 2-butanol, tert-butanol, acetone, acetic acid, lactic acid, perylene, phenol thiazine, dihydrophenazine, 5,10-di(4-methoxyphenyl)-5,10-dihydrophenazine, 5,10-dihydrophenazine, 5,10-di(4-trifluoromethylphenyl)-5,10-dihydrophenazine, and combinations thereof.

Other variations of the invention provide a system for producing biochemicals from a biomass feedstock, the system comprising:

a cooking stage configured for cooking a biomass feedstock in a heated cooking solution, to release saccharides from the biomass feedstock;

a fermentation stage configured for fermenting the saccharides to generate a first biochemical in aqueous solution, and carbon dioxide;

a catalytic or reactor vessel configured for hydrogenating the carbon dioxide with a hydrogen source to generate a second biochemical;

a first distillation column configured for separating a purified first biochemical from the aqueous solution;

optionally, a second distillation column configured for purifying the second biochemical;

a vapor recompression unit configured for mechanical vapor recompression and/or a thermal vapor recompression, wherein the vapor recompression unit is disposed in vapor-flow communication with the first distillation column, and wherein the vapor recompression unit is configured to recover heat of distillation from the first distillation column.

In some embodiments, the system further comprises a dehydration unit configured for removing additional water from the purified first biochemical. The system may be configured to utilize at least some of the heat of distillation in the dehydration unit.

In some embodiments, the system further comprises a stillage-processing unit configured for evaporation and/or drying of a bottoms stream from the first distillation column, to generate a stillage product. The system may be configured to utilize at least some of the heat of distillation in the stillage-processing unit.

The vapor recompression unit may be a mechanical vapor recompression unit. Optionally, the mechanical vapor recompression unit is driven by a combined heat and power system.

In some systems, a second distillation column is present in the system. Additional distillation columns may be present in some configurations.

Some systems are designed such that the first biochemical is different than the second biochemical. Other systems are designed such that the first biochemical is the same as the second biochemical.

In various systems, the first biochemical and the second biochemical may be independently selected from the group consisting of methanol, ethanol, 1-propanol, 2-propanol, n-butanol, isobutanol, 2-butanol, tert-butanol, acetone, acetic acid, lactic acid, perylene, phenol thiazine, dihydrophenazine, 5,10-di(4-methoxyphenyl)-5,10-dihydrophenazine, 5,10-dihydrophenazine, 5,10-di(4-trifluoromethylphenyl)-5,10-dihydrophenazine, and combinations thereof.

Figure 1:
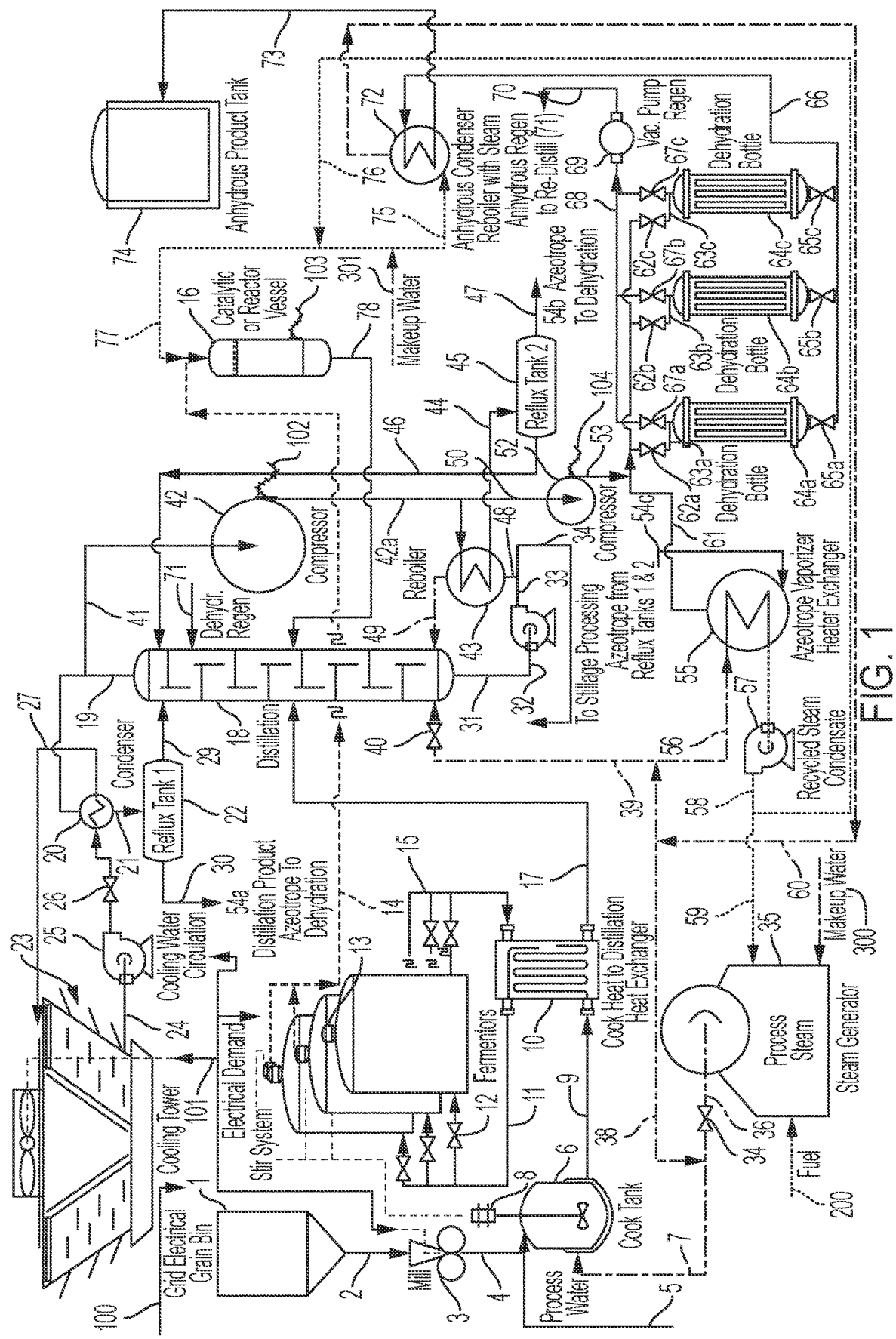
FIG. 1 depicts a biorefinery in some embodiments for converting biomass into biochemicals, utilizing fermentation-derived $CO_2$ to directly produce additional biochemicals, and utilizing vapor recompression of distillation vapors to recover distillation heat for use elsewhere in the biorefinery, such as in dehydration.

These and other embodiments, features, and advantages of the present invention will become more apparent to those skilled in the art when taken with reference to the following detailed description.

DETAILED DESCRIPTION OF EMBODIMENTS OF THE INVENTION

Certain embodiments of the present invention will now be described in more detail, in a manner that will allow a person of ordinary skill in this art to make and use the present invention. All references herein to the "invention" shall be construed to refer to non-limiting embodiments disclosed in this patent application.

Unless otherwise indicated, all numbers expressing conditions, concentrations, yields, and so forth used in the specification and claims are to be understood as being modified in all instances by the term "about." Accordingly, unless indicated to the contrary, the numerical parameters set forth in the following specification and attached claims are approximations that may vary depending at least upon the specific analytical technique. Any numerical value inherently contains certain errors necessarily resulting from the standard deviation found in its respective testing measurements.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs. If a definition set forth in this section is contrary to or otherwise inconsistent with a definition set forth in patents, published patent applications, and other publications that are incorporated by reference, the definition set forth in this specification prevails over the definition that is incorporated herein by reference.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

The use of vapor compression provides a means of increasing the temperature and pressure of vapors so that their heat of condensation is usable in upstream and downstream processing. Standard practice uses cooling water to condense vapors at low temperatures when forming final products or inter-process sub-products, losing the heat of condensation to cooling water, thereby preventing reintroduction and reuse of that heat. Vapor compression allows for the reuse of the heat of condensation when increased pressure raises the condensing temperature to a point above the temperature required for use in the process. Vapor compression is well-established in single-process applications such as water desalination and evaporation.

The present invention is predicated, at least in part, on integrated designs that optimize vapor compression between multiple processes. A process that converts generated $CO_2$ into a product is integrated into the overall plant vapor-compression system, providing opportunities to optimize energy efficiency and carbon intensity through options unavailable for single-process designs.

Integrating mechanical compression with multiple plant processes can minimize heat losses by providing advantages not available for typical cascaded heat integration. In cascaded heat integration, where energy can only be cascaded from higher to lower temperatures and pressures, the staged reduction in temperature and pressure eventually drops below the requirements for plant processes, at which point steam or process vapors are condensed, losing their latent heat. Vapor compression provides a means to raise these temperatures and pressures to a level that can be condensed and reintroduced, meeting process requirements, while minimizing energy lost to the environment. The complexity of balancing process energy needs across multiple processes has historically discouraged attempts at designing systems utilizing mechanical vapor compression in favor of simply cascading heat and discarding the heat of compression once vapors become "low-grade", i.e. too low for reuse. When vapor compression was used, process designers have historically applied vapor compression to isolated processes with the advantage of lowering the energy to that isolated process, but not realizing the greater benefit available through the integration of multiple processes.

The present inventors have discovered several advantages of integrating multiple processes in commercial system designs and, according to the present disclosure, incorporating carbon dioxide processing into these integrated designs. Means of reintroducing the latent heat of upgraded vapors and/or steam may include condensing in various heat exchangers such as reboilers or evaporators, or may include direct injection, depending on the quality and composition of the process vapors or steam.

Various methods have been proposed for utilizing the carbon dioxide produced in fermentation processes. These methods typically require significant energy to achieve the pressures and temperatures necessary to optimize product conversion and purification. Even transportation, storage, and sequestration of $CO_2$ require that the low-pressure carbon dioxide from fermentation is compressed prior to handling.

The reaction products from the catalytic conversion of carbon dioxide to biochemicals is typically a mixture of biochemicals and water, and potentially by-products, depending on the specific chemistry. The final biochemical products must normally be refined or purified to reach commercial quality. A typical titer for ethanol in the beer of a dry mill ethanol plant is about 15% by weight, with the balance being water together with non-fermentable residue. Many fermentation processes producing butanol or other products have titers of less than 5 wt % with water. Biochemicals produced from $CO_2$ conversion (rather than sugar fermentation) will also usually have at least as much water content as biochemical product streams from fermentation. Many biochemicals form azeotropes with water and require distillation with final dehydration to attain a required quality. The distillation and dehydration of biochemicals—from both fermentation and $CO_2$ conversion—represent process areas in which vapor compression can be applied for reductions in process energy.

The thermal process energy required to drive the production and refinement of biochemical end products from the conversion of carbon dioxide is large and represents a major portion of the process energy required to produce the final biochemical product. Therefore, process energy reductions and more-efficient processing enhance the economic advantages of catalytic, electrochemical, or thermal conversion of $CO_2$ to biochemicals. The separation of the $CO_2$-derived biochemical products by vapor compression improves the efficiency of the overall process through recapture of the heat of condensation.

As an example of a potential application, a biorefinery may be designed for the conversion of biomass into high-value biofuels and biochemicals. The distillery process in the biorefinery typically has fermentation as the initial process for the conversion of the biomass (sugar) substrate, where carbon dioxide is a major stoichiometric co-product of fermentation by yeast or bacteria. The carbon dioxide co-product of fermentation provides a relatively inexpensive and high-quality source of $CO_2$, often requiring minimal processing to meet requirements as a feed for conversion. In the case of ethanol from grain, approximately one-third of the mass of fermented biomass is converted to carbon dioxide of relatively high purity, minimizing the production of greenhouse gases often entailed in the separation and clean-up processes required by competing sources of $CO_2$. Reducing $CO_2$ processing energy requirements improves the economic incentives for installing and operating systems for $CO_2$ capture and reuse. Although a wide range of process options exist for use of fermenter carbon dioxide, and many new technologies are being developed, the approach and principles described herein may be flexibly applied to any proposed process design. Several examples are listed, below.

One example is catalytic hydrogenation of $CO_2$ into methanol ($CH_3OH$) using copper-zinc oxide catalysts at a temperature of about 260° C.:

$$CO_2 + 3H_2 \rightarrow CH_3OH + H_2O$$

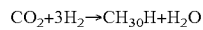

Another example is catalytic conversion of $CO_2$ into ethanol using ruthenium-halide and phosphonium-halide catalysts:

$$xCO + yCO_2 + (2x+3y)H_2 \rightarrow (x/2+y/2)C_2H_5OH + (x/2+3y/2)H_2O$$

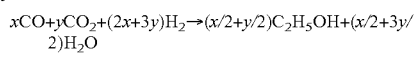

wherein x and y are adjustable in the feed composition to the reactor. For a feed with $CO_2$ and no CO (x=0), producing one mole of ethanol ($C_2H_5OH$) requires two moles of $CO_2$, and co-produces three moles of water, so that the ethanol is dilute.

In the above examples for producing methanol and ethanol, hydrogen is a reactant. Hydrogen may be obtained from an on-site hydrogen plant (e.g., via steam-methane reforming, following by separation of $H_2$ from syngas), for example. When both CO and $H_2$ are reactants to the $CO_2$-conversion reactor, the CO and $H_2$ may be provided as syngas that may be obtained through various means, such as an on-site steam-methane reformer or a gasifier that converts a process stream into syngas, for example.

In some embodiments, CO or $H_2$ are not necessary as reactants. For example, $CO_2$ may be electrochemically converted into a product, such as ethanol or ethylene. In such embodiments, CO and/or $H_2$ may be intermediate species generated during conversion, but may not need to be separately fed to the reactor.

Also, $H_2O$ is typically, but not necessarily, a reactant in the conversion of $CO_2$ to products. Even when $H_2O$ is not a reactant, it may be generated as a reaction intermediate. Typically, $H_2O$ will be present as a solvent, or gas-entraining liquid, for reactants and products.

An example of a relevant electrochemical reaction is the conversion of carbon dioxide to ethanol. A generalized electrochemical catalysis reaction describing the conversion of carbon dioxide to ethanol is:

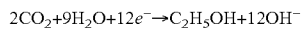
$$2CO_2+9H_2O+12e^- \rightarrow C_2H_5OH+12OH^-$$

which utilizes electrons, in the form of electrochemical reduction, to selectively reduce carbon dioxide to ethanol in the presence of electrochemical catalysts (e.g., copper-silver composite catalysts). The $OH^-$ ions may be neutralized to salts that may be removed from the product. Generally, in an electrochemical system, there will be an excess of water present.

Other possible products of $CO_2$ conversion include, but are not limited to, alkanes, olefins, aromatics, heterocyclics, and other complex organic compounds. Photochemical reactions may be utilized to provide the necessary energy to split the $CO_2$ molecule for conversion to products. Photochemical reactions may generate electrons for direct reduction such as in the reaction shown above, may generate heat that thermally converts $CO_2$, or may utilize photons from sunlight or from other sources (e.g., lasers) to convert $CO_2$. All of these reactions almost invariably lead to a watery biochemical product requiring distillation and possible dehydration to meet commercial product specifications.

Some variations of the invention provide a method for the modification and augmentation of a distillery or biorefinery with the addition of advanced distillation methods for heat management by mechanical (or thermal) vapor recompression of vapors recovers the heat of distillation providing a reduction in process thermal energy, wherein the separation and refinement of the produced fermented biochemicals have additional organic products resulting from carbon dioxide reformation or conversion. Some variations provide a system in which the mechanical (or thermal) vapor recompression is sized or operated in concert with existing heat-integrated processes to reduce the thermal energy required in processes of distillation and evaporation with or without dehydration. A standard steam generator may be operated at a reduced rate as a result of the reduction in steam energy demand due to energy recovered by the mechanical (or thermal) vapor recompression of distillation vapors.

The concept of mechanical vapor compression in distillation has been deployed in reducing process requirements in refining for many decades. It has also been widely deployed in water desalination and process evaporation. Mechanical vapor compression, when used in distillation, recycles the heat of distillation by a closed heat pump, as disclosed, for example, in U.S. Pat. Nos. 4,340,446, 4,422,903, 4,539,076, 4,645,569, 4,692,218, 4,746,610, 5,294,304, 7,257,945, 8,101,217, 8,101,808, 8,114,255, 8,128,787, 8,283,505, 8,304,588, 8,535,413, and 8,614,077, which are hereby incorporated by reference herein. Thermal vapor compression, when used in distillation, evaporation, dehydration, and drying, recycles latent heat by a closed heat pump, as disclosed for example in U.S. Pat. Nos. 5,772,850, 4,536,258, and 4,585,523, which are hereby incorporated by reference herein. These methods of energy recovery have been rarely utilized, however, in the distillation processes of bio-fermentation producers.

In this disclosure, mechanical vapor recompression (MVR) and/or thermal vapor recompression (TVR) are preferably used to produce vapor that meets conditions to best integrate and optimize energy recovery between processes, and to reduce overall process thermal energy usage in the biorefinery. The heat of condensation of the compressed vapors provides energy that may be used elsewhere, i.e. beyond the distillation process. Heat exchangers utilizing multiple effects, thermal vapor recompression, and/or mechanical vapor recompression are used to balance process conditions by increasing or decreasing vapor energy to serve process design requirements.

All instances of "vapor compression," "vapor recompression," MVR, TVR, and the like mean mechanical vapor recompression, thermal vapor recompression, or a combination thereof. Thermal vapor recompression may also be referred to as thermocompression or steam compression.

A more detailed description of certain embodiments of the present invention such that a person of ordinary skill in this art can make and use the present invention follows. Note that all references herein to the "invention" shall be construed as references to embodiments of the invention.

In various embodiments, a starting biomass feedstock may be selected from agricultural crops and/or agricultural residues. In some embodiments, agricultural crops are selected from starch-containing feedstocks, such as corn, wheat, cassava, rice, potato, millet, sorghum, or combinations thereof. In some embodiments, agricultural crops are selected from sucrose-containing feedstocks, such as sugarcane, sugar beets, or combinations thereof.

Lignocellulosic biomass may also be used as the biomass feedstock. Lignocellulosic biomass includes, for example, plant and plant-derived material, vegetation, agricultural waste, forestry waste, wood waste, paper waste, animal-derived waste, poultry-derived waste, and municipal solid waste. In various embodiments, the biomass feedstock may include one or more materials selected from: timber harvesting residues, softwood chips, hardwood chips, tree branches, tree stumps, knots, leaves, bark, sawdust, off-spec paper pulp, cellulose, corn, corn stover, wheat straw, rice straw, sugarcane bagasse, switchgrass, *miscanthus*, animal manure, municipal garbage, municipal sewage, commercial waste, grape pumice, almond shells, pecan shells, coconut shells, coffee grounds, grass pellets, hay pellets, wood pellets, cardboard, paper, carbohydrates, plastic, and cloth. Mixtures of starch-containing and/or sucrose-containing feedstocks with cellulosic feedstocks, for example, may be used.

Figure 2:
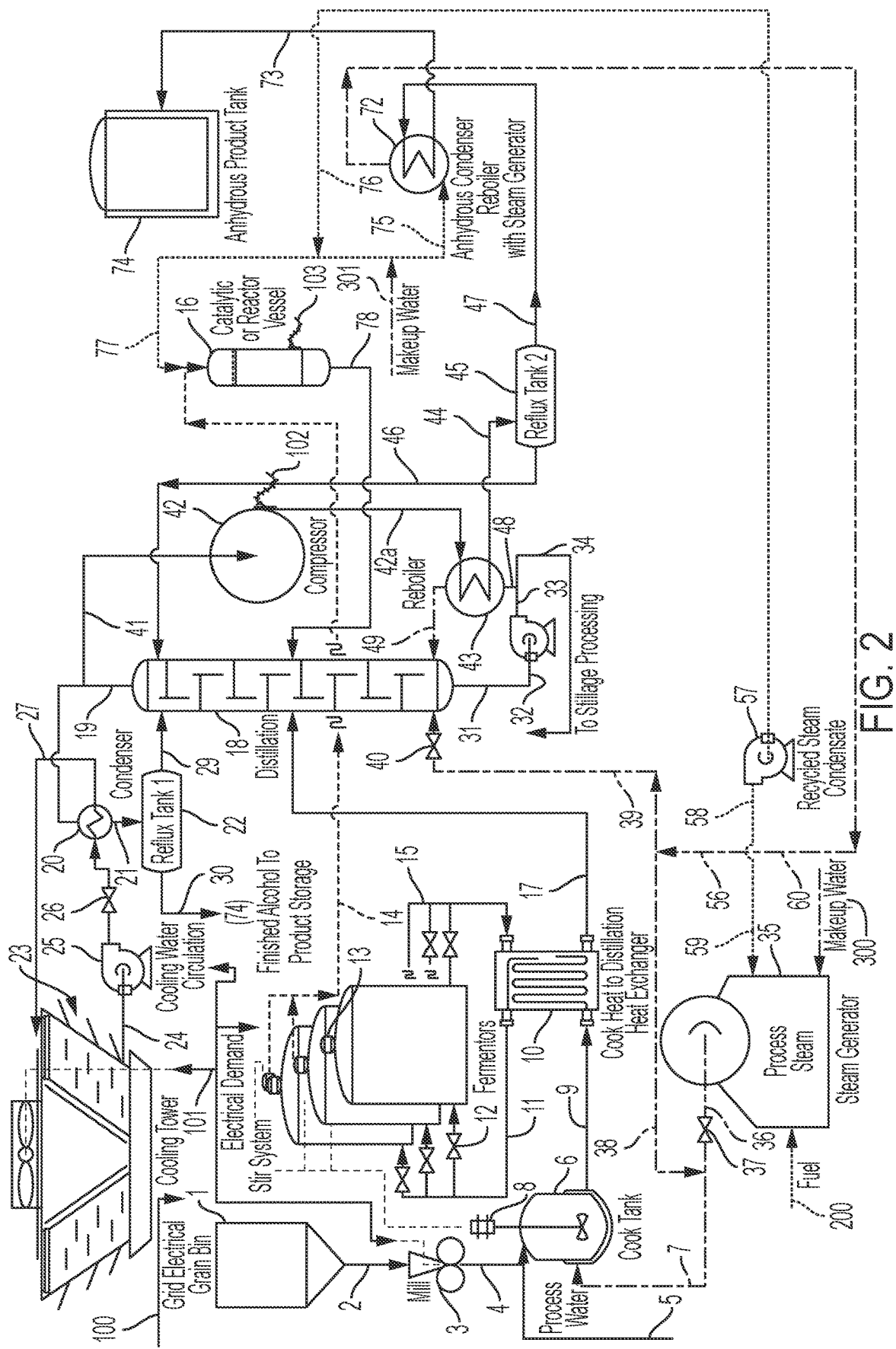
FIG. 2 depicts a biorefinery in some embodiments for converting biomass into biochemicals, utilizing fermentation-derived $CO_2$ to directly produce additional biochemicals, and utilizing vapor recompression of distillation vapors to recover distillation heat for use elsewhere in the biorefinery, such as in stillage processing.

The flow diagrams of FIGS. 1 and 2 display a biorefinery in which biochemical is produced from biomass by grinding, cooking, and fermenting the biomass, then distilling and/or dehydrating the resulting product. The biorefinery has support for steam-driven processing and mechanical vapor recompression in distillation, with or without dehydration.

The fermentation produces a beer solution of non-fermented biomass with a water-diluted biochemical, and carbon dioxide. The carbon dioxide is reacted (e.g., catalytically) to form watery biochemicals that also require distillation and, potentially, dehydration.

FIG. 1 depicts a biorefinery in which the produced biochemical requires dehydration to complete the water removal for the production of commercial-quality biochemical. FIG. 2 depicts a biorefinery in which the biochemical can reach commercial quality without dehydration and therefore this embodiment does not include a dehydration stage in the process. The biorefinery includes an additional process stage in which the carbon dioxide from fermentation is converted to a biochemical, which may be the same as the biochemical produced in the bio-fermentation (as shown in FIGS. 1 and 2), or different than that biochemical. The biochemical produced from carbon dioxide is then processed through the biorefinery's distillation process, in the same distillation columns as those utilized for the fermentation-derived biochemical (as shown in FIGS. 1 and 2), or in different distillation column(s). The finished product of the distillation may require dehydration if it forms an azeotrope.

Each of FIGS. 1 and 2 contains a mechanical vapor recompression system in evaporation, distillation, and, for FIG. 1, dehydration. Each of FIGS. 1 and 2 displays steam generation used to balance process thermal energy requirements. Mechanical vapor compression provides a variable means of offsetting the thermal energy required by varying the portion of the vapors that are compressed. In each of FIGS. 1 and 2, there is mechanical vapor recompression within distillation. In FIG. 1 only, there is mechanical vapor recompression within dehydration.

The bio-fermentation process for the production of fermentation-based biochemicals, along with carbon dioxide conversion to a biochemical, is described in FIG. 1 and FIG. 2 and may include the following general stages:

an optional milling stage or device(s) which process biomass by physically dividing the feedstock materials, such as with a grinding or extrusion process which exposes the internal parts of the feedstock;

a cooking stage which uses various combinations of controlled temperatures, pressures, stirring, and special chemical conditioning, optionally with enzymes or acid catalysts, for breaking polysaccharides into saccharides (e.g., glucose and/or xylose);

a heat-exchanger stage which cools the cook solution to fermentation temperatures and, conversely, heats post-fermentation products to distillation temperatures;

a fermentation stage in which the fermentation liquid has biological agents introduced to ferment to carbon dioxide plus desired watery biochemical products, wherein the biochemical products pass directly to the distillation, and wherein the carbon dioxide passes directly to the catalytic or reactor vessel;

a catalytic or reactor vessel configured to convert the carbon dioxide gas (from fermentation), optionally with water vapors (optional stream shown in FIGS. 1 and 2) and optionally with other reactants such as $H_2$ or CO, reacting with $CO_2$ to form additional watery biochemical products;

a distillation stage after the fermented products have been pre-heated in the heat exchanger of the heat-exchanger stage, wherein the biochemical top products are separated from the fermentation waters;

a condensation stage in which the vapors from the distillation stage are passed on to a cooling system where the heat of distillation is discarded or where the vapors are mechanically compressed to recover the heat of distillation;

a stillage handling stage for the bottom product of the distillation stage, for recovering wet co-products of the fermentation for further processing and possible drying and, potentially, evaporation to concentrate thin stillage;

a dehydration stage for the biochemical products from the distillation stage, if it has not sufficiently separated the biochemicals from the fermentation water; and a storage stage in which the high-grade biochemical goes to storage.

Some embodiments are shown in FIG. 1 and FIG. 2 having a common process path with the process flow beginning with raw biomass being stored in bin 1, which delivers the biomass substrate via delivery duct 2 to a milling/extrusion process 3. The milling/extrusion process 3 is a mechanical pretreatment that reduces the biomass substrate to a suitable size such that the internal portions of the raw biomass are exposed for chemical conversion and processing. The milled biomass flour passes via duct 4 where additional chemicals, which may include enzymatic agents, are added to the cooking process in cooking vessel 6 (also referred to as a cook tank).

The biomass flour passing from duct 4 is mixed with process water from process line 5 where the mixed flour and process water enter cooking vessel 6. Within cooking vessel 6, required temperatures and pressures are attained through the addition of process steam from line 7, completing chemical conversion to fermentable saccharides with the assistance of stirring system 8.

The product of chemically converted slurry from cooking vessel 6 passes via process line 9 to heat exchanger 10 where the heat invested into the cook process is removed prior to fermentation, which typically occurs at lower temperatures than cooking. The cook slurry, after being cooled in heat exchanger 10, is transported by process line 11, which is controlled via valve system 12, to a battery of fermenters. The fermenters may be configured as a batch or continuous fermentation system, with stirring system 13. A fermentation-derived first biochemical is produced within the fermenters. Carbon dioxide co-product of the fermentation process passes via dotted line 14 to reactor vessel 16 (labeled Catalytic or Reactor Vessel).

The fermentation-derived $CO_2$ may be referred to as biocarbon dioxide or renewable carbon dioxide, since the $CO_2$ is derived from biomass, rather than, for example, fossil-fuel combustion. This may be shown from a measurement of the $^{14}C/^{12}C$ isotopic ratio of the carbon dioxide, using, for example, ASTM D6866.

The catalytic or reactor vessel 16 is configured to reduce the carbon dioxide by hydrogenation to form organic alcohols, alkanes, olefins, aromatics, and/or other chemicals, which collectively may be referred to as $CO_2$-derived biochemicals or a second biochemical, which is preferably (but not necessarily) the same molecule as the first biochemical. The catalytic or reactor vessel 16 may utilize catalysis, electrolysis, thermolysis (thermal reformation), or a combination thereof, to convert the carbon dioxide to more complex organics. The temperature of the catalytic or reactor vessel 16 may be operated from about 300° C. to about 2000° C., for example, and the pressure of the catalytic or reactor vessel 16 may be from about 1 bar to about 100 bar, for example. Various catalysts may be present within the catalytic or reactor vessel 16, such as metal-oxide catalysts, e.g. CuO, ZnO, or $ZrO_2$. In some embodiments (e.g., employing electrolysis or other electrochemical reactions), the catalytic or reactor vessel 16 is configured, such as with electrodes within the reactor, to receive electrical power via source 103.

In certain embodiments, the catalytic or reactor vessel 16 utilizes a biocatalyst for hydrogenating $CO_2$. Bioconversion of $H_2/CO_2$ to acetic acid, ethanol, or other products is well-known. Any suitable microorganisms may be utilized that have the ability to convert $CO_2$, co-fed with CO and/or $H_2$. Anaerobic bacteria, such as those from the genus *Clostridium*, have been demonstrated to produce ethanol from CO, $H_2$, or $CO_2$ via the acetyl CoA biochemical pathway. For example, various strains of *Clostridium ljungdahlii* that produce ethanol from gases are described in U.S. Pat. Nos. 5,173,429, 5,593,886, and 6,368,819.

Because organic molecules typically contain hydrogen, a source of H atoms is necessary in the catalytic or reactor vessel 16. The hydrogen source may be water, hydrogen gas, syngas, or methane, for example. In the embodiments of FIGS. 1 and 2, water enters the catalytic or reactor vessel 16 via line 77. The watery reaction products from the catalytic or reactor vessel 16 pass via line 78 to the distillation process 18 for refinement.

In some embodiments, the hydrogen source is relatively pure hydrogen that may be obtained from separation of syngas. The syngas may be produced in a steam-methane reforming reactor, or in a biomass gasifier, for example.

The fermentation slurry that contains the desired biochemical product (i.e., the first biochemical) as a watery solution with other soluble and insoluble side products passes via valve-controlled line 15 to the distillation system 18 (labeled Distillation) via process line 17. The biochemical product of the fermentation is heated via heat exchanger 10 that passes heat, recovered from the high-temperature cook slurry feeding into the fermentation system, to the fermentation product.

The distillation system 18 further processes the watery fermented solution to separate desired biochemical products from the water, thereby yielding a top product which has a biochemical product composition that may approach an azeotrope with water. An azeotropic composition will require dehydration (as shown for FIG. 1), whereas a composition which may be near-purity with respect to the desired biochemical (as shown for FIG. 2) will not require dehydration. The azeotrope or nearly pure biochemical product passes out of the distillation system as vapors via vapor line 19 that leads to one of two different process paths.

In the case where the vapors pass to a standard distillation condenser 20, the condensed distillation top product passes via liquid line 21 to holding reflux tank 22 (labeled Reflux Tank 1).

In the case where the vapors pass away from the condenser, the top product of the distillation system 18 passes via vapor line 19, which is potentially split with the condenser system 20 to an optional vapor line 41 that passes to compressor 42. The compressor 42 receives mechanical energy from an electrical source 102.

The distillation condenser system 20 is cooled by cooling system 23 (labeled Cooling Tower). The cooling water from cooling system 20 passes via pipe 24 to circulation pump 25. This pump transfers the cooling water by valve-controlled pipe 26 to condenser 20, after which the cooling water is returned via pipe 27 to cooling system 23.

The distillation top product leaving the condenser passes via liquid line 29 to the reflux tank/buffer and then to distillation system 18 as reflux. The remainder of the condensed distillation top product from distillation system 18 that does not pass to reflux is either the final biochemical product, pure or sufficiently pure, or an azeotrope with water that passes via liquid line 30 to dehydration system (54*a*).

The bottom product of the distillation system 18 which contains the heavy components as stillage, passes via liquid line 31 to pump 32. The bottom product then passes via line 33 to one of two potential paths where it passes to final bottom products via liquid line 33 or cycles through reboiler-condenser(s) 43 via liquid line(s) 48. The final bottom product passes away from the distillation system 18 via liquid line 34 where the stillage is further processed to recover co-products having commercial value. Additionally, bottom products may be centrifugally separated and the centrate, thin stillage, may be returned to the reboiler-condenser(s) 43 prior to passing to line 48.

The distillation system 18 may in part be driven thermally by a steam generator 35, where the production steam passes via steam line 36 with a control valve 37, potentially serving other thermal demands in the system such as steam line 7 to the cook process. The steam generator 35 is fueled via fuel line 200. The bidirectional steam line 38 forms a means of transporting potential waste heat from a compressor 52 optionally driven by a combined heat and power system via steam line 53 as well as steam from the steam generator 35. The steam line 39 is controlled by a valve 40 to control delivery of steam to potentially drive the distillation system 18.

The reboiler-condenser(s) 43 produces condensate that is nearly pure biochemically in FIG. 2, or an azeotrope in FIG. 1, passing via liquid line 44 to compression side reflux tank 45 (labeled Reflux Tank 2). The condensed pure or azeotrope biochemical product passes via liquid line 46 to the distillation system 18.

The compression side reflux tank 45 passes the residual condensate as distillation top product via liquid line 47, in FIG. 1, to the dehydration system (54*b*); or, in FIG. 2, to the Anhydrous Product Tank 74.

The electricity driving the mechanical power for compressor 42 is provided via electrical source 102, in both FIG. 1 and FIG. 2. In FIG. 1, electricity driving the compressor 52 is provided via electrical source 104.

Steam line 38 connects to steam line 7 that heats the cook tank 6 and, in FIG. 1, connects to steam line 56 that drives the azeotrope dehydration vaporizer 55. The steam generator 35 provides the balance of steam required to operate the process beyond the thermal heat recovered by the mechanical vapor recompression.

When an azeotrope requires further removal of water to reach the desired biochemical product quality, the distillation top product passes via liquid lines 30 and 47 to a vapor-phase, molecular-sieve, pressure-swing dehydration system or other final dehydration system. This system receives the azeotropic product via line 54*c*. The liquid or vapor azeotropic product moving to the dehydration system from the distillation is preferably vaporized, such as superheated vapors at an increased pressure, which occurs in heat exchanger 55 (labeled Azeotrope Vaporizer Heat Exchanger). FIG. 1 includes a compressor 52, wherein a portion of the biochemical vapors are further compressed, passing via line 53 directly to the dehydration via line 61, thereby removing the need for additional external heat from generated steam. The steam, via line 56, condenses as the azeotrope vaporizes or superheats vapors via line 54*c*, with the azeotropic vapors passing via vapor line 61 to the dehydration system. The process steam which drives the vaporizer heat exchanger 55 condenses and the liquid condensate is recycled to steam generator 35 via condensate line 57. The liquid condensate then passes to recycle pump 58 where the recycle condensate is returned to steam generator 35.

FIG. 1 shows the pressurized, vapor-phase dehydration system depicted as a three-bottle system, though the number of bottles may be two or greater. The dehydration system passes the pressurized vapors via a three-valve configuration, wherein one of the bottles is in dehydration mode while the two alternative bottles are being regenerated under low pressure. The three bottles are cycled in a round-robin style with each bottle being used for a period based on the capacity of the dehydration medium while the alternative bottles are regenerating through application of a vacuum to recover the captured water. A portion of the dehydrated product is used to backflush the regenerated bottles, so the regenerated bottle can be placed back in service when the captured water is removed.

The dehydration system passes the pressurized vapors via vapor line 61 to a system of control valves 62a/62b/62c, where an open valve passes the pressurized vapors to the appropriate vapor line 63a/63b/63c, which passes the product to the dehydrating bottle 64a/64b/64c, that is in service during that period of operation. The dehydrated product passes through the dehydrating bottle via the exiting control valves 65a/65b/65c, to vapor line 66 as anhydrous biochemical product.

The dehydration bottles being regenerated pass a fraction of the dehydrated vapors from the one active bottle to backflush the regenerating bottles. The low-pressure bottle is controlled by control valves 67a/67b/67c, with the regeneration vapors containing a mixture of the regenerated water vapors and the backflush anhydrous product passing via vapor line 68. The regeneration is driven by a vacuum pump system 69, where the vapors are pumped via line 70. The dehydration regeneration product is returned to the distillation system 18 via line 71 for re-distillation of the regeneration product containing the backflush product.

The final anhydrous biochemical product from the dehydration process passes as a vapor to an anhydrous condenser reboiler 72, where the final product is condensed and passed via liquid line 73 to storage tank 74 (labeled Anhydrous Biochemical Tank). The anhydrous condenser is cooled by the condenser water via condensate water line 75, wherein the heated water is vaporized to steam in reboiler 72, with the steam passed via steam line 75 for use in driving the thermal demands of the biorefinery.

A portion of the cooling water, including the makeup water from lines 300 and 301, provides water for condenser 72, where the excess water passes to a catalytic or reactor vessel 16 via line 77, providing water as a hydrogen source for the hydrogenation or other reactions of $CO_2$ within the catalytic or reactor vessel 16.

In the process depicted in FIGS. 1-2, there are various stream splits. One skilled in the arts of biorefinery design/operation or chemical engineering will be able to determine the split fractions in order to achieve the desired process outcome, while maintaining mass balance. The process may be simulated to determine split ratios that best achieve the desired energy integration.

FIG. 1 and FIG. 2 provide a flow diagram demonstrating a method and system in some embodiments. One skilled in the art, in view of the present disclosure, will be able to design a vapor-compression system for use within the distillation process of the biorefinery. Such a biorefinery may produce a wide variety of products including, but not limited to, methanol, ethanol, 1-propanol, 2-propanol, n-butanol, isobutanol, 2-butanol, tert-butanol, acetone, acetic acid, lactic acid, perylene, phenol thiazine, dihydrophenazine, 5,10-di(4-methoxyphenyl)-5,10-dihydrophenazine, 5,10-dihydrophenazine, 5,10-di(4-trifluoromethylphenyl)-5,10-dihydrophenazine, and other heterocyclic compounds. Co-products include, but are not limited to, dried distillers grains (DDG), dried distillers grains with solubles (DDGS), still bottoms, sugars, lignin, and exported energy.

As an example of the general principles taught herein, a biorefinery may be configured to produce ethanol, by fermenting saccharides using yeast as well as by catalytically hydrogenating $CO_2$ (from fermentation) to an additional quantity of ethanol. It will be understood by a skilled artisan that the present invention is by no means limited to the biorefinery being an ethanol plant.

In addition, as will be appreciated by a person of ordinary skill in the art, the principles of this disclosure may be applied to many biorefinery configurations beyond those explicitly disclosed or described in the drawings hereto. Various combinations are possible and selected embodiments from some variations may be utilized or adapted to arrive at additional variations that do not necessarily include all features disclosed herein. In particular, while some embodiments are directed to ethanol as the primary biofuel/biochemical, the present invention is by no means limited to ethanol. One or more additional distillation or other separation units may be included to separate components of a fermentation mixture. Also, in some embodiments, the primary product is less volatile than water (at atmospheric pressure), rather than more volatile, as is the case with ethanol. An example of a biofuel/biochemical less volatile than water is isobutanol.

Most distillation processes heat beer fed to a distillation column with steam to raise its temperature to the beer's boiling point and then continue to add energy with steam as needed to overcome the beer's heat of evaporation or latent heat, converting the ethanol in the beer into vapors. Ethanol's lower boiling point (versus water) causes the ethanol to vaporize and exit the top of the distillation column. The solids in the beer, along with water and other liquids with boiling points higher than that of ethanol, are collected in the bottom of the distillation column and then transferred to a centrifuge where a wet cake containing solids and a significant proportion of liquids is separated from a liquid centrate. This wet cake is typically transferred to a dryer where the solids are dried to a moisture level appropriate for storage and shipping. Meanwhile, the alcohol vapors exiting the top of the distillation column are typically directed to a water-cooled condenser where they condense, transferring their heat of condensation to condenser cooling water prior to transfer of the condensate to a dehydration process for final upgrading to a marketable ethanol product (as required by azeotropic limitations in making high-purity ethanol).

In should be noted that regarding FIGS. 1 and 2, specific unit operations may be omitted in some embodiments and in these or other embodiments, other unit operations not explicitly shown may be included. Various valves, pumps, meters, sensors, sample ports, etc. are not shown in these block-flow diagrams. Additionally, multiple pieces of equipment, either in series or in parallel, may be utilized for any unit operations. Also, solid, liquid, and gas streams produced or existing within the process may be independently recycled, passed to subsequent steps, or removed/purged from the process at any point.

In certain embodiments, a combined heat and power (CHP) sub-system is included in the overall system. An optional CHP sub-system has a CHP engine and is configured to provide mechanical, electrical, and/or thermal energy for driving vapor compression, wherein the CHP sub-system and vapor compression may be integrated and configured so that residual waste heat of the CHP engine offsets process thermal energy usage in the biorefinery.

For example, an MVR unit may be configured with a standard steam generator to reduce thermal energy required in the distillation. The optional CHP engine may be sized in concert with (i) mechanical demand of the MVR unit and (ii) thermal energy demand of the biorefinery. The waste heat recovered by a CHP system optionally provides at least some of the thermal energy demand of the biorefinery, and may drive an optional TVR unit.

As another example using CHP, a TVR unit may be configured with a standard steam generator to reduce thermal energy required in distillation. The optional CHP engine may be sized in concert with (i) thermal demand of the TVR unit and (ii) thermal energy demand of the biorefinery. The waste heat recovered by a CHP system optionally provides at least some of the motive vapor to drive a TVR vapor jet and/or provide for the thermal energy demand of the biorefinery.

The throughput, or process capacity, may vary widely from small laboratory-scale units to full commercial-scale biorefineries, including any pilot, demonstration, or semi-commercial scale systems. In various embodiments, the process capacity is at least about 1 kg/day, 10 kg/day, 100 kg/day, 1 ton/day (all tons are metric tons), 10 tons/day, 100 tons/day, 500 tons/day, 1000 tons/day, 2000 tons/day, 3000 tons/day, 4000 tons/day, or higher.

The biorefinery may be a retrofit to an existing plant. In other embodiments, the biorefinery is a greenfield plant.

All publications, patents, and patent applications cited in this specification are incorporated herein by reference in their entirety as if each publication, patent, or patent application was specifically and individually put forth herein. This specification hereby incorporates by reference commonly owned U.S. Pat. No. 9,925,476, issued Mar. 27, 2018, and U.S. Pat. No. 9,925,477, issued Mar. 27, 2018, and U.S. patent application Ser. No. 15/711,699 filed Sep. 21, 2017 (published on Feb. 1, 2018 as U.S. Patent App. Pub. No. 2018/0028934 A1).

In this detailed description, reference has been made to multiple embodiments of the invention and non-limiting examples and drawings relating to how the invention can be understood and practiced. Other embodiments that do not provide all of the features and advantages set forth herein may be utilized, without departing from the spirit and scope of the present invention. This invention incorporates routine experimentation and optimization of the methods and systems described herein. Such modifications and variations are considered to be within the scope of the invention defined by the claims.

Where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process, when possible, as well as performed sequentially.

Therefore, to the extent that there are variations of the invention which are within the spirit of the disclosure or equivalent to the inventions found in the appended claims, it is the intent that this patent will cover those variations as well. The present invention shall only be limited by what is claimed.

What is claimed is:

1. A process for producing biochemicals from a biomass feedstock, said process comprising:
   (a) cooking a biomass feedstock in a heated cooking solution, to release saccharides from said biomass feedstock;
   (b) fermenting said saccharides to generate a first biochemical in aqueous solution, and carbon dioxide;
   (c) hydrogenating said carbon dioxide with a hydrogen source to generate a second biochemical;
   (d) feeding said first biochemical in said aqueous solution to a first distillation column, to generate a purified first biochemical;
   (e) feeding said second biochemical to said first distillation column, or to a second distillation column, to generate a purified second biochemical; and
   (f) compressing vapors from said first distillation column, using mechanical vapor recompression and/or thermal vapor recompression, to recover heat of distillation of said first biochemical.

2. The process of claim 1, said process further comprising mechanically treating said biomass feedstock prior to step (b).

3. The process of claim 1, wherein said first biochemical in aqueous solution is preheated via heat exchange with said heated cooking solution, prior to feeding said first biochemical in said aqueous solution to said first distillation column.

4. The process of claim 1, wherein said heat of distillation from step (f) is utilized, at least in part, for said heating said heated cooking solution in step (a).

5. The process of claim 1, said process further comprising dehydration of said purified first biochemical, to generate a highly purified first biochemical.

6. The process of claim 5, wherein said heat of distillation from step (f) is utilized, at least in part, for said dehydration of said purified first biochemical.

7. The process of claim 1, said process further comprising evaporation and/or drying of a bottoms stream from said first distillation column, to generate a stillage product.

8. The process of claim 7, wherein said heat of distillation from step (f) is utilized, at least in part, for said evaporation and/or drying of said bottoms stream from said first distillation column.

9. The process of claim 1, wherein said heat of distillation from step (f) is utilized, at least in part, for directly or indirectly providing heat in step (c).

10. The process of claim 1, wherein in step (f), said vapors are compressed using said mechanical vapor recompression.

11. The process of claim 10, wherein said mechanical vapor recompression is driven by an electrical source.

12. The process of claim 1, wherein in step (c), said hydrogen source is water.

13. The process of claim 12, wherein said water is derived from said aqueous solution.

14. The process of claim 12, wherein said water is recycled steam condensate.

15. The process of claim 1, wherein said carbon dioxide passes directly to step (c).

16. The process of claim 1, wherein all $CO_2$ hydrogenated in step (c) is from said carbon dioxide generated in step (b).

17. The process of claim 1, wherein said first biochemical is the same as said second biochemical.

18. The process of claim 17, wherein said second biochemical is fed to said first distillation column.

19. The process of claim 1, wherein said first biochemical is different than said second biochemical.

20. The process of claim 19, wherein said second biochemical is fed to said second distillation column, and wherein vapors from said second column are compressed, using mechanical vapor recompression and/or thermal vapor recompression, to recover heat of distillation of said second biochemical.

21. A system for producing biochemicals from a biomass feedstock, said system comprising:
- a cooking stage configured for cooking a biomass feedstock in a heated cooking solution, to release saccharides from said biomass feedstock;
- a fermentation stage configured for fermenting said saccharides to generate a first biochemical in aqueous solution, and carbon dioxide;
- a catalytic or reactor vessel configured for hydrogenating said carbon dioxide with a hydrogen source to generate a second biochemical;
- a first distillation column configured for separating a purified first biochemical from said aqueous solution;
- optionally, a second distillation column configured for purifying said second biochemical;
- a vapor recompression unit configured for mechanical vapor recompression and/or a thermal vapor recompression, wherein said vapor recompression unit is disposed in vapor-flow communication with said first distillation column, and wherein said vapor recompression unit is configured to recover heat of distillation from said first distillation column.

22. The system of claim 21, said system further comprising a dehydration unit configured for removing additional water from said purified first biochemical.

23. The system of claim 22, wherein said system is configured to utilize at least some of said heat of distillation in said dehydration unit.

24. The system of claim 21, said system is configured for evaporation and/or drying of a bottoms stream from said first distillation column, to generate a stillage product.

25. The system of claim 24, wherein said system is configured to utilize at least some of said heat of distillation in generating said stillage product.

26. The system of claim 21, wherein said vapor recompression unit is a mechanical vapor recompression unit.

27. The system of claim 26, wherein said mechanical vapor recompression unit is driven by an electrical source.

28. The system of claim 21, wherein said second distillation column is present in said system.

* * * * *